US012346104B2

United States Patent
Ottnad et al.

(10) Patent No.: US 12,346,104 B2
(45) Date of Patent: Jul. 1, 2025

(54) METHOD FOR DETERMINING AND CORRECTING THE MACHINE STATE OF A MACHINE TOOL, AND DIAGNOSTIC SYSTEM

(71) Applicant: TRUMPF Werkzeugmaschinen SE + Co. KG, Ditzingen (DE)

(72) Inventors: Jens Ottnad, Karlsruhe (DE); Leonie Felica Tatzel, Korntal (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 335 days.

(21) Appl. No.: 17/844,905

(22) Filed: Jun. 21, 2022

(65) Prior Publication Data

US 2022/0317654 A1 Oct. 6, 2022

Related U.S. Application Data

(63) Continuation of application No. PCT/EP2020/087168, filed on Dec. 18, 2020.

(30) Foreign Application Priority Data

Dec. 20, 2019 (DE) .................... 10 2019 220 485.6

(51) Int. Cl.
*G05B 23/02* (2006.01)
*G05B 19/401* (2006.01)
*G05B 19/404* (2006.01)

(52) U.S. Cl.
CPC ....... *G05B 23/0283* (2013.01); *G05B 19/401* (2013.01); *G05B 19/404* (2013.01); *G05B 2219/50297* (2013.01)

(58) Field of Classification Search
CPC .......................... G05B 19/401; G05B 19/404; G05B 19/4065; G05B 19/409; G05B 19/4155;
(Continued)

(56) References Cited

U.S. PATENT DOCUMENTS 9,355,441 B2\* 5/2016 Wersborg ............. B23K 26/032
9,492,886 B2\* 11/2016 Stork Genannt Wersborg ............
B23K 26/02
(Continued)

FOREIGN PATENT DOCUMENTS

CN 102581244 A 7/2012
CN 103100678 A 5/2013
(Continued)

OTHER PUBLICATIONS

De Mitri, et al., "Image Acquisition, Evaluation and Segmentation of Thermal Cutting Edges Using a Mobile Device," *Proceedings of SPIE*, 11059, pp. 1-3, Jun. 21, 2019, Society of Photo-Optical Instrumentation Engineers, Bellingham, WA, USA.
(Continued)

*Primary Examiner* — Crystal J Barnes-Bullock
(74) *Attorney, Agent, or Firm* — LEYDIG, VOIT & MAYER, LTD.

(57) ABSTRACT

A method for ascertaining and correcting the defective machine state and/or at least one defective component state of a machine tool includes ascertaining the state using imaging and analysis of a cut edge produced and comparing with selected machine parameters and making the correction by way of a maintenance instruction based on the machine state for maintaining the machine tool.

14 Claims, 2 Drawing Sheets

(58) Field of Classification Search
CPC ............ G05B 19/4163; G05B 19/4183; G05B 19/41875; G05B 19/4207; G05B 23/0283; G05B 23/0286; G05B 23/0289; G05B 23/0297; B23Q 15/12
See application file for complete search history.

(56) References Cited

U.S. PATENT DOCUMENTS

| | | | |
|---|---|---|---|
| 9,529,343 B2 * | 12/2016 | Bauer | G05B 19/409 |
| 10,115,190 B2 * | 10/2018 | Hallasch | G01N 21/55 |
| 10,664,767 B2 * | 5/2020 | Takigawa | B23K 26/707 |
| 10,960,493 B2 * | 3/2021 | Hyatt | B23K 26/342 |
| 11,137,739 B2 * | 10/2021 | Takahei | B23Q 15/12 |
| 11,249,456 B2 | 2/2022 | Shapiro et al. | |
| 11,249,458 B2 * | 2/2022 | Li | G06T 7/0008 |
| 11,360,467 B2 * | 6/2022 | Buggenthin | G05B 23/0227 |
| 11,809,155 B2 * | 11/2023 | Garvey | G05B 19/4207 |
| 11,816,831 B2 * | 11/2023 | Koenig | G06T 7/0012 |
| 11,960,843 B2 * | 4/2024 | Lin | G06V 10/82 |
| 2011/0278277 A1 | 11/2011 | Stork Genannt Wersborg | |
| 2013/0178952 A1 | 7/2013 | Wersborg et al. | |
| 2013/0184839 A1 | 7/2013 | Bauer et al. | |
| 2016/0129528 A1 | 5/2016 | Hyatt et al. | |
| 2017/0008123 A1 * | 1/2017 | Mezawa | B22F 10/25 |
| 2017/0109874 A1 | 4/2017 | Hallasch et al. | |
| 2017/0270434 A1 | 9/2017 | Takigawa et al. | |
| 2019/0317475 A1 * | 10/2019 | Li | G05B 19/4099 |
| 2023/0211435 A1 * | 7/2023 | Nishiwaki | B23K 31/006 219/121.11 |

FOREIGN PATENT DOCUMENTS

| | | | | |
|---|---|---|---|---|
| CN | 103111753 A | | 5/2013 | |
| CN | 108734142 A | * | 11/2018 | |
| CN | 109753979 A | | 5/2019 | |
| CN | 110226137 A | | 9/2019 | |
| CN | 110633882 A | * | 12/2019 | ............ B23D 55/10 |
| CN | 109291657 B | * | 10/2020 | ............ B41J 2/471 |
| CN | 111823221 A | * | 10/2020 | |
| CN | 114868134 A | * | 8/2022 | ............ B23K 31/02 |
| CN | 116158215 A | * | 5/2023 | |
| CN | 118070983 B | * | 7/2024 | |
| DE | 10311822 A1 | | 10/2004 | |
| DE | 102010030691 A1 | | 1/2012 | |
| DE | 102012203752 A1 | | 9/2013 | |
| DE | 102015222207 A1 | | 5/2016 | |
| DE | 102016212290 A1 | | 1/2017 | |
| JP | 2012509190 A | | 4/2012 | |
| JP | 2017164801 A | | 9/2017 | |
| KR | 20100115594 A | * | 10/2010 | |
| KR | 101439430 B1 | * | 9/2014 | |
| KR | 20160127461 A | * | 11/2016 | |
| KR | 20190017021 A | * | 2/2019 | |
| WO | WO-2007063527 A2 | * | 6/2007 | ........... B23D 63/005 |
| WO | WO 2015127271 A1 | | 8/2015 | |
| WO | WO-2021123268 A2 | * | 6/2021 | ............ B23K 31/02 |

OTHER PUBLICATIONS

Stahl, et al., "Quick Roughness Evaluation of Cut Edges Using a Convolutional Neural Network," *Proceedings of SPIE* 11172, pp. 1-8, Jul. 16, 2019, Society of Photo-Optical Instrumentation Engineers, Bellingham, WA, USA.

* cited by examiner

METHOD FOR DETERMINING AND CORRECTING THE MACHINE STATE OF A MACHINE TOOL, AND DIAGNOSTIC SYSTEM

CROSS REFERENCE TO RELATED APPLICATIONS

This application is a continuation of International Application No. PCT/EP2020/087168 (WO 2021/123268 A2), filed on Dec. 18, 2020, and claims benefit to German Patent Application No. DE 10 2019 220 485.6, filed on Dec. 20, 2019. The aforementioned applications are hereby incorporated by reference herein.

FIELD

The present invention relates to a method for determining and correcting the machine state of a machine tool, in particular a laser cutting machine, and to a diagnostic system.

BACKGROUND

The machine state of a machine tool is a frequent cause of unsatisfactory surface quality during machining, in particular during laser cutting. In the case of laser cutting methods, this leads to poor quality at the cut edge of the workpiece. The machine state is dependent on the states of the individual components. By way of example, the shield gas of a laser cutting machine can influence the focal position and the nozzle of a laser cutting machine can influence the gas dynamics. The individual components are superimposed in their effect on the overall state of the machine.

In practice, therefore, it is not possible for professionals to attribute a quality defect at the cut edge to one or more specific individual components. Instead, ascertaining the faulty components requires a standardized manual maintenance program containing at least 13 sequential individual steps to be performed on spec.

The maintenance measures require long machine downtimes and the use of well-trained professionals to perform them. This gives rise to substantial costs and production losses in the event of maintenance.

The prior art admittedly proposes methods for taking a recording of a cut edge as a basis for improving quality features of a workpiece surface. However, the known methods always assume an optimum machine state.

SUMMARY

In an embodiment, the present disclosure provide a method for determining and correcting a machine state of a machine tool, comprising the steps of providing a surface image of a cut edge surface produced by the machine tool; analyzing the surface image using a data aggregation routine and so as to ascertain actual machine parameters determinable from the surface image; selecting selected machine parameters on the machine tool; comparing the actual machine parameters with the selected machine parameters so as to ascertain a difference between the actual machine parameters and the selected machine parameters; determining the machine state, based on the difference; and outputting a maintenance instruction for correcting the machine state.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
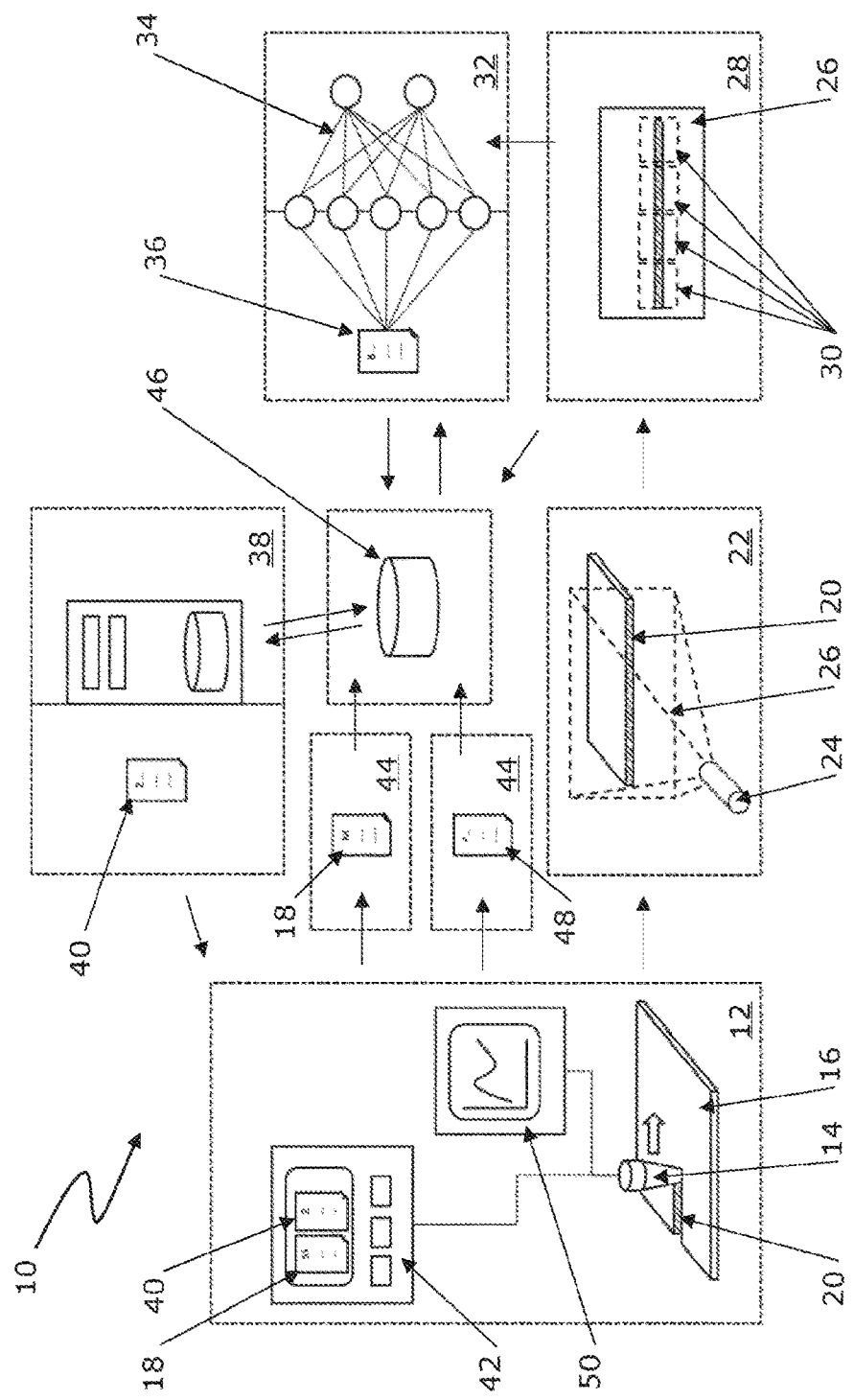
FIG. 1 shows a schematic representation of the method according to the invention.

The invention is based on the object of providing a method and a diagnostic system that allow a faulty machine state to be ascertained and corrected simply and quickly.

The object is achieved by a method as claimed in patent claim 1 and a diagnostic system as claimed in patent claim 4. The subclaims convey preferred embodiments.

The object is therefore achieved according to the invention by a method for determining and correcting the machine state of a machine tool, in particular a laser cutting machine, comprising the method steps of:

A) providing a surface image of a surface produced by the machine tool, in particular a cut edge surface;

B) analyzing the surface image by means of a data aggregation routine and ascertaining actual machine parameters that are determinable from the surface image;

D) providing machine parameters that are selected on the machine tool;

wherein the method comprises the following method steps:

I) comparing the actual machine parameters with the selected machine parameters;

J) determining the machine state, in particular the component states, on the basis of the previously ascertained difference between the actual machine parameters and the selected machine parameters;

K) outputting a maintenance instruction for correcting the machine state.

The output of a maintenance instruction for correcting the machine state, according to the invention, may relate to one or more definite individual components of the machine. Maintenance of the entire machine in the form of a large number of individual checks on spec is therefore eliminated in a particularly time-effective and inexpensive manner.

The order of the indicated method steps is particularly advantageous with regard to a fast method sequence, but should not be understood as conclusive. A modified order is likewise conceivable.

The invention therefore relates to a method for ascertaining and correcting the defective machine state and/or at least one defective component state of a machine tool.

The first method step involves providing an image of the surface produced by the machine tool, in particular of the cut edge. The surface image is provided in particular in the form of a photograph, particularly preferably in the form of a digital color photograph. This allows the surface image to be provided and to continue to be used particularly quickly and simply. A surface image in this case is merely understood to mean the image of the machined workpiece surface. If an image additionally contains a surroundings image of the workpiece surroundings besides the surface image, then there is provision for the image to be reduced to the surface image. In other words, the surface image is cut free from an overall image containing a surroundings image. There may be provision for a further method step for this purpose. The surface image is particularly preferably cut free during the analysis of the surface image. This allows the method to be performed particularly simply and quickly.

The method comprises at least one, in particular multiple, data aggregation routine(s). A data aggregation routine may be meant to aggregate multiple "ascertained data" to produce a new data packet. The new data packet may comprise one or more numbers or vectors. All or part of the new data packet may be made available to further data aggregation routines as "ascertained data". "Ascertained data" may be e.g. machine parameters, material parameters, machining parameters or data packets made available by one of the data aggregation routines. A method is particularly preferably designed in the form of an algorithm containing multiple connected data aggregation routines. In particular, several hundred, in particular several thousand, such data aggregation routines may be connected to one another. This significantly improves the quality and speed of the method. The method may comprise a function containing weighted variables. A, in particular multiple, particularly preferably all, data aggregation routine(s) may be meant to combine, in particular to multiply, each of multiple "ascertained data" with, or by, a weighted variable and thus to convert the "ascertained data" into "combined data" so as then to aggregate, in particular to add, the "combined data" to produce a new data packet. Suitable weighted variables may be ascertained by performing the method using data, in particular machine parameters, material parameters and/or machining parameters, that are known to belong together in each case.

The features of the machine and machining parameters and also the cut edge features may themselves be data packets, in particular multiple structured data, in particular data vectors or data arrays, that may themselves again be "ascertained data" e.g. for the method, in particular for the data aggregation routines of the method.

One method step involves the surface image being analyzed by means of the data aggregation routine, in particular a convolutional neural network (CNN). For this purpose, the data aggregation routine first ascertains the relevant image region of the surface image provided. This ensures that image regions with low quality, or blurred image regions, are identified prior to the analysis by the data aggregation routine and, if necessary, interpreted secondarily in the analysis, in particular removed from the analysis. This allows the quality and speed of the method to be improved further.

The data aggregation routine analyzes the surface with regard to the surface finish, in particular the surface structure, and ascertains actual machine parameters of the machine tool that form the basis of the surface finish. Actual machine parameters are the actually operative machine settings of the machine tool that lead to the imaged workpiece surface. By way of example, the laser power that actually arrives at the sheet metal during the cutting process of a laser cutting machine when the laser cutting machine is in the faulty state may differ from the selected laser power. Therefore, the actual machine parameters in a fault-free, in particular very good, machine state correspond to the selected machine parameters.

For the purposes of the invention, the machine parameters may comprise the machining parameters (referred to as "process parameters" in some prior art documents), such as for example the focal position, the feed rate and/or the gas pressure, of the machine tool, since these likewise allow the state of individual components to be inferred. The enumeration should not be understood as exhaustive. By way of example, an altered feed rate may suggest a fault in the drive. In addition, any machine settings that influence the cut edge surface should be understood as machine parameters.

A further method step involves the selected machine parameters of the machine tool being provided and being compared with the actual machine parameters by the data aggregation routine. In other words, actual and selected machine parameters are compared. The data aggregation routine uses this comparison to ascertain the difference between actual and selected machine parameters, or the difference between the optimum machine state and the actual machine state. The machine state may be determined by the state of just one individual component of the machine tool.

The difference may be formed in a single value, in multiple values and/or in multidimensional comparisons (tables, graphs, etc.). In particular, the difference may be provided in the form of an inventory of the machine components that are relevant to production of the cut surface, in particular of all machine components, with a representation of a fault probability. This allows the derived maintenance instruction to be understood particularly easily.

The ascertained states of the individual component and the resultant machine state are subsequently used to output at least one definite maintenance instruction in order to correct the faulty machine state. This is not proposing that the selected cutting parameters of the machine tool be optimized in a manner intended to improve the cut edge quality on the basis of a current machine state that is assumed to be optimum, but rather that the machine state be optimized on the assumption of optimally selected cutting parameters. This particularly advantageously allows the definite individual component to be maintained by a professional without in-depth machine knowledge. Complex machine maintenance is no longer required.

In a preferred development of the method, the selected machine parameters are ascertained from an image, in particular a photograph, of an operator unit of the machine tool. This allows the selected machine parameters that are needed for the method to be provided by the user particularly simply for diagnosis. In particular, there may be provision for the image to be evaluated by means of the data aggregation routine and for the selected machine parameters to be ascertained automatically. In this case, there may be provision for a comparison between the image and the ascertained selected machine parameters to be checked by a professional.

Alternatively or additionally, there may be provision for the selected machine parameters to be provided by way of a machine interface and/or automatic image production on the user interface. This allows the selected machine parameters to be ascertained automatically for diagnosis.

Additional preference is accorded to a development of the method in which at least one process parameter ascertained by a process sensor system is provided. The at least one process parameter may be provided by way of a sensor system interface in the form of a variable and/or in the form of an image, in particular a photograph, that is evaluated by a data aggregation routine. The process sensor system is used to monitor and record the machining process by the machine tool. The process sensor system comprises at least one sensor for ascertaining a process-relevant quantity, for example a speed of advance, process temperature, process gas pressure, etc. This list should be understood as merely illustrative and not exhaustive.

The object on which the invention is based is additionally achieved by a diagnostic system according to the invention for carrying out the method according to the invention, having an imager module, a data utilization module having a data aggregation routine, a reference module, an evaluation module and an output module, wherein the imager module is designed to provide an image, in particular a photograph, of a surface machined by the machine tool and wherein the data aggregation routine is designed to evaluate the image of the machined surface with regard to the surface quality and to ascertain actual machine parameters, and wherein the reference module is designed to provide selected machine parameters, wherein the evaluation module is designed to take the actual machine parameters and the selected machine parameters as a basis for ascertaining the machine state, in particular the component states, and wherein a maintenance instruction based on the machine state can be provided by way of the output module.

The imager module comprises a central buffer store and at least one imaging apparatus, in particular a camera, particularly preferably a smartphone camera. The at least one imaging apparatus may be mobile and/or fixed relative to the machine tool. In particular, the imager module comprises at least one imaging apparatus that is fixed relative to the machine tool and one variable imaging apparatus. The at least one imaging apparatus is designed to store images on a central buffer store. For this purpose, the at least one imaging apparatus may be connected to the data memory by way of a permanent or temporary data transmission connection, in particular wirelessly. In particular, there may be provision for the data transmission to be performed by way of a smartphone application. This allows the access to the central buffer store to be facilitated particularly simply.

The central buffer store may comprise at least one, in particular multiple, digital storage unit(s). The central buffer store is designed to manage the digital storage units and the data store. For this purpose, the central buffer store may transfer storage instructions, in particular data labels, to the imager module. This allows the central buffer store to be particularly advantageously used centrally for multiple diagnostic systems. The imager module may be designed to make a machine and/or diagnosis association for the stored images, in particular following receipt of a storage instruction by the central buffer store. This allows images transferred by the imager module to be stored on the central buffer store in a particularly structured manner.

In a preferred embodiment of the diagnostic system, there is provision for the reference module to be designed to ascertain the selected machine parameters directly from the machine tool. The reference module is designed to communicate with the machine tool. The communication may be formed by way of a permanent and/or temporary data transmission between the machine tool and the reference module.

Additional preference is accorded to an embodiment in which the reference module is designed to ascertain the selected machine parameters from an image, in particular a photograph, of the operator unit of the machine tool. This allows fast data capture and/or data transfer of the selected machine parameters to the reference module and avoids errors during manual data transmission from the operator unit to the reference module. To this end, the diagnostic system may comprise an imaging apparatus that is fixed relative to the machine tool and/or a mobile imaging apparatus.

Particular preference is accorded to an embodiment in which the image of the operator unit of the machine tool is provided by the imager module, in particular the imaging apparatus for imaging the machined surface. This allows the same imaging apparatus to be used for transferring the image of the cut edge and the operator unit in a particularly simple manner. In particular, the images transferred by the imager module are evaluated directly by the data aggregation routine. The reference module may therefore access already evaluated information particularly simply.

In a preferred embodiment, the diagnostic system comprises a central buffer store that is designed to store and provide all of the parameters relevant to the method. In particular, the actual machine parameters provided, the selected machine parameters, process parameters and all of the ascertained data and information (parameters relevant to the method) are stored on the central buffer store under an individual diagnosis identifier, in particular with a machine-tool and user identifier. It is therefore particularly advantageously possible to resort to past diagnosis cases for further analyses.

Additional preference is accorded to an embodiment in which the imager module comprises a smartphone and/or a camera that is fixed relative to the machine tool. This allows particularly fast capture of the machined surface and/or the selected machine parameters.

In a preferred embodiment, the evaluation module is arranged at a physical interval from the machine tool. The arrangement of the evaluation module at an interval from the machine tool is understood in this case to mean a physically long distance between the evaluation module and the machine tool. A connection in this case is preferably made by way of a data network, in particular by way of the Internet. Arrangement of the evaluation module at a physical interval allows the data aggregation routine to be supplied with processing power and energy centrally and to be used for multiple diagnostic systems particularly inexpensively.

Further advantages become apparent from the description and the drawing. Likewise, the features mentioned above and those that will be explained further can be used in each case by themselves or as a plurality in any desired combinations. The embodiments shown and described should not be understood as an exhaustive enumeration, but rather are of illustrative character for outlining the invention.

FIG. 1 shows a schematic representation of the method 10 according to the invention. A machining step 12 involves a machine tool 14 machining a workpiece 16 in accordance with machine parameters 18 that are selected on the machine tool 14. The selected machine parameters 18 comprise not only the machine tool parameters but also the machining parameters, in particular the cutting parameters, of the machine tool for the machining step 12. The machined workpiece 16 has a machined surface 20.

The machined surface 20 is imaged, in particular photographed, by an imaging apparatus 24, in particular a camera, which is preferably arranged in a manner fixed relative to the machine tool, in a subsequent imaging step 22, and an image 26 of the machined surface 20 of the workpiece 16 is produced.

Figure 2:
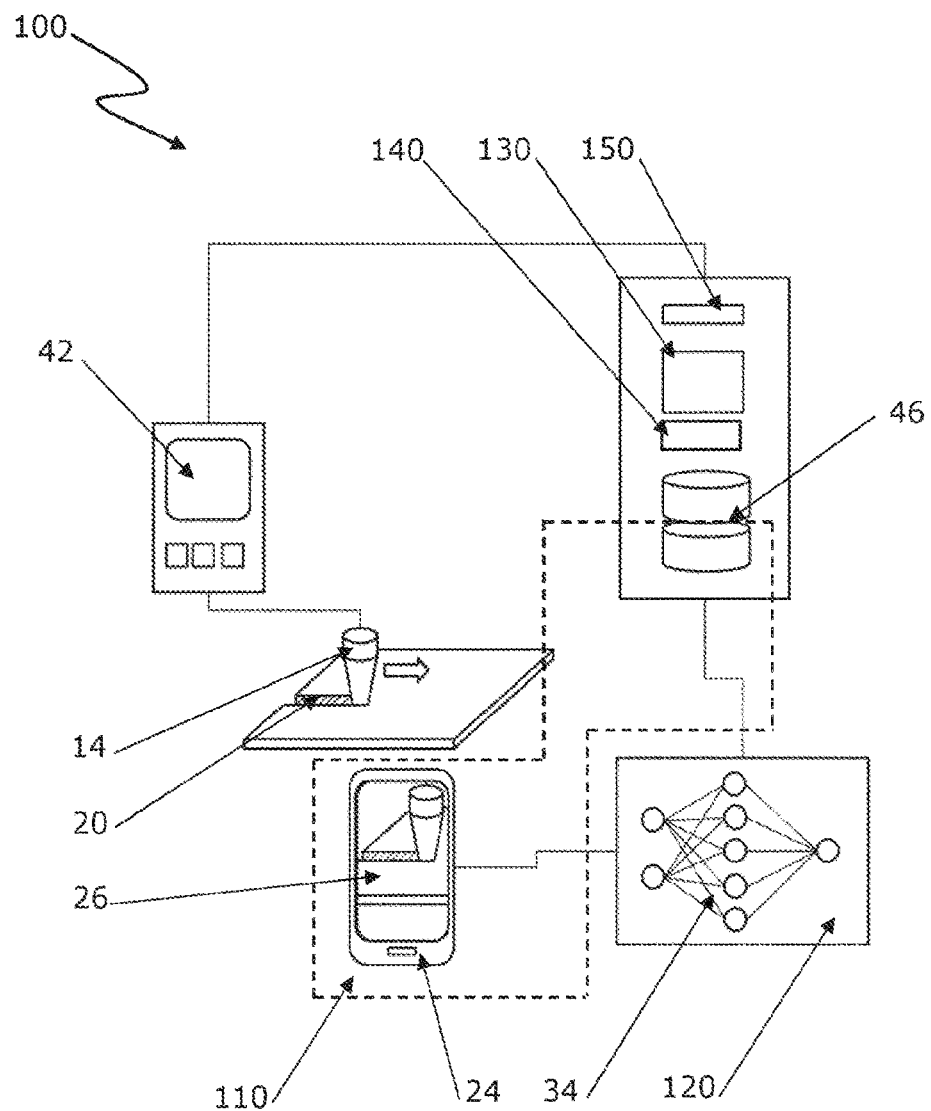
FIG. 2 shows a schematic representation of an embodiment of a diagnostic system according to the invention.

A preparation step 28 involves the image 26 produced being divided into subregions 30. The subregions 30 are categorized according to irrelevant and relevant subregions 30. Irrelevant subregions 30 are characterized for example by the workpiece surroundings that are also imaged or by blurred representation of the machined surface 20. Relevant subregions have good resolution and quality in the image of the machined surface 20, for example. In addition, there may be provision for further criteria for dividing, or for reducing, the image 26. By way of illustration, FIG. 2 shows four subregions 30, the number and levels of detail of which should be understood merely by way of illustration, however. It is moreover conceivable for the subregions 30 to be classified into further, for example partially relevant, categories.

An analysis step 32 involves the machined surface 20 being analyzed by a data aggregation routine 34, in particular a convolutional neural network (CNN). In this case, it is conceivable for the preparation step 28 to be performed directly before the analysis step 32 by the same data aggregation routine 34. This allows the method 10 to be performed particularly effectively, and less storage space is required. The data aggregation routine 34 takes the image 26 of the machined surface 20 as a basis for ascertaining actual machine parameters 36 that are used to produce the machined surface 20 when the machine state is intact.

A comparison step 38 involves the selected machine parameters 18 being compared with the actual machine parameters 36, and the difference being ascertained. The difference permits conclusions about the nature of the individual components of the machine tool 14 and results in output of a maintenance instruction 40 for correcting the machine state.

In the embodiment shown in FIG. 1, the machine parameters 18 selected on an operator unit 42 of the machine tool 14 are provided to the method 10 by way of a data transmission 44. This is accomplished for example by way of manual input and/or by way of a data connection between the machine tool 14 and a central buffer store 46.

The central buffer store 46 is furthermore used to store the image 26 of the machined surface 20, the ascertained actual machine parameters 36 and possible process parameters 48.

The process parameters 48 are produced by way of a process sensor system 50 during the machining step 12. The process sensor system 50 is used to monitor the machining step 12 and the machine tool 14 and detects the prevailing conditions.

FIG. 2 shows a diagnostic system 100 according to the invention, in particular for performing the method 10. The diagnostic system 100 comprises an imager module 110 having an imaging apparatus 24, software and a central buffer store 46. The imaging apparatus 24 in the form of a smartphone is used to produce the image 26 of the machined surface 20. This means that it is possible to dispense with costly fitting of the machine tool 14 with an imaging apparatus 24, for example in the form of a camera that is fixed relative to the machine tool (see FIG. 1). The software of the imager module 110 is designed to make a data connection to the central buffer store 46 and/or to a data utilization module 120. This allows firstly storage of the image 26 on the central buffer store 46 and secondly further processing of the image 26 in the data utilization module 120.

The data utilization module 120 comprises the data aggregation routine 34 and is used to divide the image 26 of the machined surface 20 into subregions 30 (see FIG. 1) and to analyze the image 26 of the machined surface 20. Results of the analysis and production of the subregions 30 (see FIG. 1) are stored on a central buffer store 46, which is linked to the data utilization module 120 by means of a data transmission 44.

A data transmission 44 between a reference module 130 and the operator unit 42 is used to transmit selected machine parameters 18 (see FIG. 1; machining parameters and machine settings) to the diagnostic system 100 and to store them on the central buffer store 46.

An evaluation module 140 ascertains the, in particular multidimensional, difference between the selected machine parameters 18 (see FIG. 1) and the actual machine parameters 36 (see FIG. 1) and also the machine state of the machine tool 14. The data transmission 44 is used to transmit a maintenance instruction 40 (see FIG. 1) for maintaining the machine tool 14 to an output unit, in particular the operator unit 42 and/or the smartphone of the imager module 110, that is accessible to a professional commissioned to maintain the machine tool 14, by way of an output module 150.

Taking all the figures of the drawing jointly into consideration, the invention relates to a method 10 for ascertaining and correcting the defective machine state and/or at least one defective component state of a machine tool 14, wherein the state is ascertained by means of imaging 26 and analysis 32 of a cut edge 20 produced and comparison 38 with selected machine parameters 18 and the correction is made by way of a maintenance instruction 40 based on the machine state for maintaining the machine tool 14.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 method;
12 machining step;
14 machine tool;
16 workpiece;
18 selected machine parameters;
20 machined surface;
22 imaging step;
24 imaging apparatus;
26 imaging of the machined surface;
28 preparation step;
30 subregion;
32 analysis step;
34 data aggregation routine;
36 actual machine parameters;

38 comparison step;
40 maintenance instruction;
42 operator unit;
44 data transmission;
46 central buffer store;
48 process parameters;
50 process sensor system;
100 diagnostic system;
110 imager module;
120 data utilization module;
130 reference module;
140 evaluation module;
150 output module.

The invention claimed is:

1. A method for operating a machine tool, the method comprising:
   A) receiving a surface image of a cut edge surface of a workpiece produced by the machine tool operating with selected machine parameters to cut the workpiece;
   B) analyzing the surface image using the data aggregation routine so as to ascertain the actual machine parameters of the machine tool that resulted in producing the cut edge surface, the data aggregation routine comprising a convolutional neural network (CNN), the CNN being configured to ascertain a surface finish from the surface image, and to ascertain the actual machine parameters of the machine tool that produced the surface finish by aggregating a plurality of ascertained data using weighted variables, the plurality of ascertained data corresponding to machine parameters that are known to produce corresponding surface finishes;
   C) obtaining the selected machine parameters that are selected on the machine tool;
   D) comparing the actual machine parameters with the selected machine parameters so as to ascertain a difference between the actual machine parameters and the selected machine parameters;
   E) determining a machine state based on the difference between the actual machine parameters and the selected machine parameters;
   F) determining a maintenance instruction for correcting the machine state based on the determined machine state;
   G) executing the maintenance instruction on the machine tool so that the actual machine parameters for a subsequent cut correspond to the selected machine parameters; and
   H) operating the machine tool to perform the subsequent cut.

2. The method as claimed in claim 1, wherein the obtaining of the selected machine parameters comprises analyzing an image of an operator unit of the machine tool using the data aggregation routine to ascertain the selected machine parameters.

3. The method as claimed in claim 1 further comprising ascertaining at least one process parameter using a process sensor system comprising at least one sensor.

4. The method as claimed in claim 1, wherein the machine tool comprises a laser cutting machine.

5. The method as claimed in claim 1, wherein the machine state comprises a state of at least one component of the machine tool.

6. A system for automatically operating a machine tool, the system comprising:
   the machine tool configured with selected machine parameters, the machine tool configured to cut a workpiece to produce the cut edge surface based on the selected machine parameters; and
   an imager module comprising a camera configured to provide a surface image of the cut edge surface; and
   a convolutional neural network (CNN), the CNN being configured to ascertain a surface finish from the surface image, and to ascertain actual machine parameters of the machine tool that produced the surface finish by aggregating a plurality of ascertained data using weighted variables, the plurality of ascertained data corresponding to machine parameters that are known to produce corresponding surface finishes,
   wherein the system is configured to:
      use the CNN to ascertain the surface finish and the actual machine parameters;
      compare the actual machine parameters with the selected machine parameters to ascertain a difference between the actual machine parameters and the selected machine parameters;
      determine a machine state based on the difference between the actual machine parameters and the selected machine parameters;
      determine a maintenance instruction for correcting the machine state based on the determined machine state; and
      operate the machine tool to perform a subsequent cut, the machine tool having the machine state corrected based on the maintenance instruction so that the actual machine parameters for the subsequent cut correspond to the selected machine parameters.

7. The system as claimed in claim 6, wherein the system further comprises a reference module that is configured to ascertain the selected machine parameters directly from the machine tool.

8. The system as claimed in claim 6, wherein the reference module is configured to ascertain the selected machine parameters from an image of an operator unit of the machine tool using the CNN.

9. The system as claimed in claim 8, wherein the image of the operator unit is provided to the reference module by the imager module.

10. The system as claimed in claim 6, further comprising a central buffer store configured to store and provide the selected machine parameters and the actual machine parameters.

11. The system as claimed in claim 6, wherein the camera is fixed relative to the machine tool.

12. The system as claimed in claim 6, wherein the evaluation module is disposed at a physical interval from the machine tool.

13. The system as claimed in claim 6, wherein the imager module comprises a smartphone.

14. The system as claimed in claim 6, wherein the machine tool comprises a laser cutting machine.

* * * * *